United States Patent [19]

Martin et al.

[11] 3,860,764

[45] Jan. 14, 1975

[54] ELECTRONIC TONE GENERATOR

[75] Inventors: Kenneth Watt Martin; John Moniak, both of Corinth, Miss.

[73] Assignee: International Telephone and Telegraph Corporation, New York, N.Y.

[22] Filed: Jan. 12, 1973

[21] Appl. No.: 322,929

[52] U.S. Cl. .............................................. 179/84 T

[51] Int. Cl. .............................................. H04m 3/02

[58] Field of Search... 179/84 T, 84 VF, 1 M, 84 R; 84/1.01; 340/392, 384 E; 331/49

[56] References Cited

UNITED STATES PATENTS

| | | | |
|---|---|---|---|
| 2,759,179 | 8/1956 | Kircher | 179/84 T |
| 3,508,012 | 4/1970 | Golembeski | 179/84 T |
| 3,617,597 | 11/1971 | Uba | 84/1.01 |
| 3,740,490 | 6/1973 | McAlonie | 179/84 VF |
| 3,744,022 | 7/1973 | Olsen | 340/52 R |

*Primary Examiner*—William C. Cooper
*Assistant Examiner*—Joseph A. Popek
*Attorney, Agent, or Firm*—James B. Raden; Marvin M. Chaban

[57] ABSTRACT

A tone generator is disclosed for simulating the chime for use as an audible telephone signal responsive to each burst of ringing signal. To produce this sound, two pairs of tone frequencies are generated and fed to a transducer or speaker. Each tone pair includes two frequencies whose nominal frequency differs by approximately 10 Hz. The frequency pairs are separated by a musical third to produce a harmonious audible. The tone pair outputs are initiated at consequent time periods to produce two related chime sounds.

8 Claims, 12 Drawing Figures

ELECTRONIC TONE GENERATOR

BACKGROUND OF THE INVENTION

As a starting point, bells or ringers are well-known. Multiple tone chimes derived mechanically are known. Electronic sound synthesizers productive of audible tones are also known.

SUMMARY OF THE INVENTION

The object of this invention is to produce a sound similar to that produced by successively striking gongs or bells, through the use of electronic audio circuits powered by and activated by a standard telephone ringing voltage.

It is a further object of the invention to produce a harmonious — electronically generated chime sound responsive to a telephone ringing signal.

It is a still further object of the invention to provide an electronic tone generator which produces four tones in two pairs, the tones of a pair being close in base frequency and the pairs being separated by a musical third to produce a two tone audio output.

It is another object of the invention to provide an electronic tone generator which produces an essentially two-tone output the tones being spaced in starting time from one another in response to a single input signal.

Operation of the electronic tone generator is as follows: A large capacitor is charged in response to the start of a burst of ringing voltage until four sine wave oscillators begin oscillating. These oscillators are paired such that the sum of the first two oscillators eventually produce a "ding" output from a transducer and the sum of the second two oscillators produce a "dong" output from the transducer. Two variable gain amplifiers interface each pair of oscillators to a power amplifier driving the transducer. The first variable gain amplifier delays its frequencies until approximately ¼ second after receipt of ringing voltage. It then suddenly releases its frequencies in a large burst that gradually tapers down to zero, very similar to the response of a mechanically struck bell. The second variable gain amplifier performs exactly as the first, except that it delays its output until the input ringing voltage switches off (approximately 1 second after it switched on, and approximately ¾ second after release of the first variable gain amplifier). Thus, a realistic "ding-dong" chime effect is produced on each burst of ringing voltage.

The objects noted and other features and advantages of the invention will become apparent from the following specification taken in conjunction with the accompanying drawings of which the following is a brief description.

DETAILED DESCRIPTION

Figure 1:
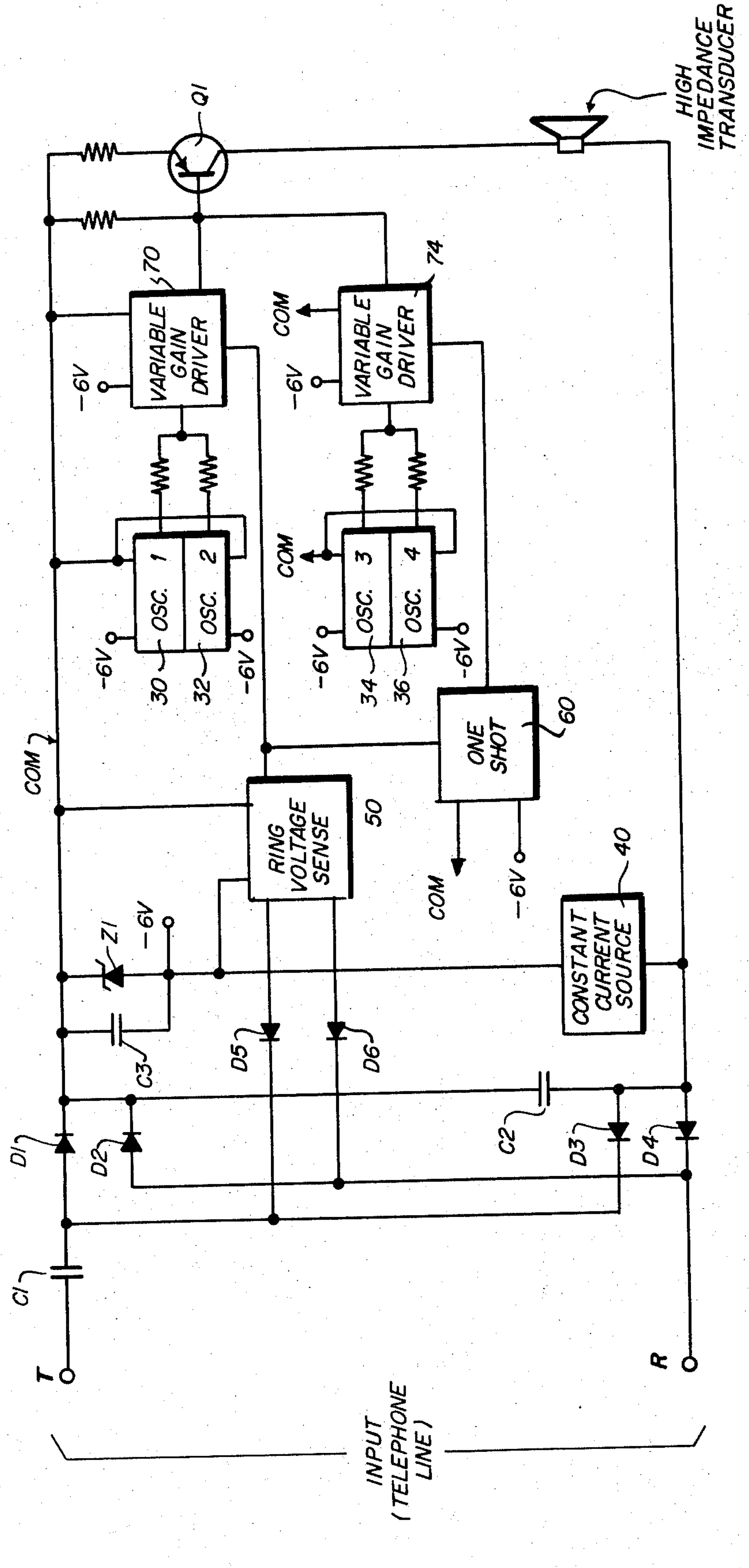
FIG. 1 is a schematic block diagram of the circuit embodying the present invention.
Figure 2:
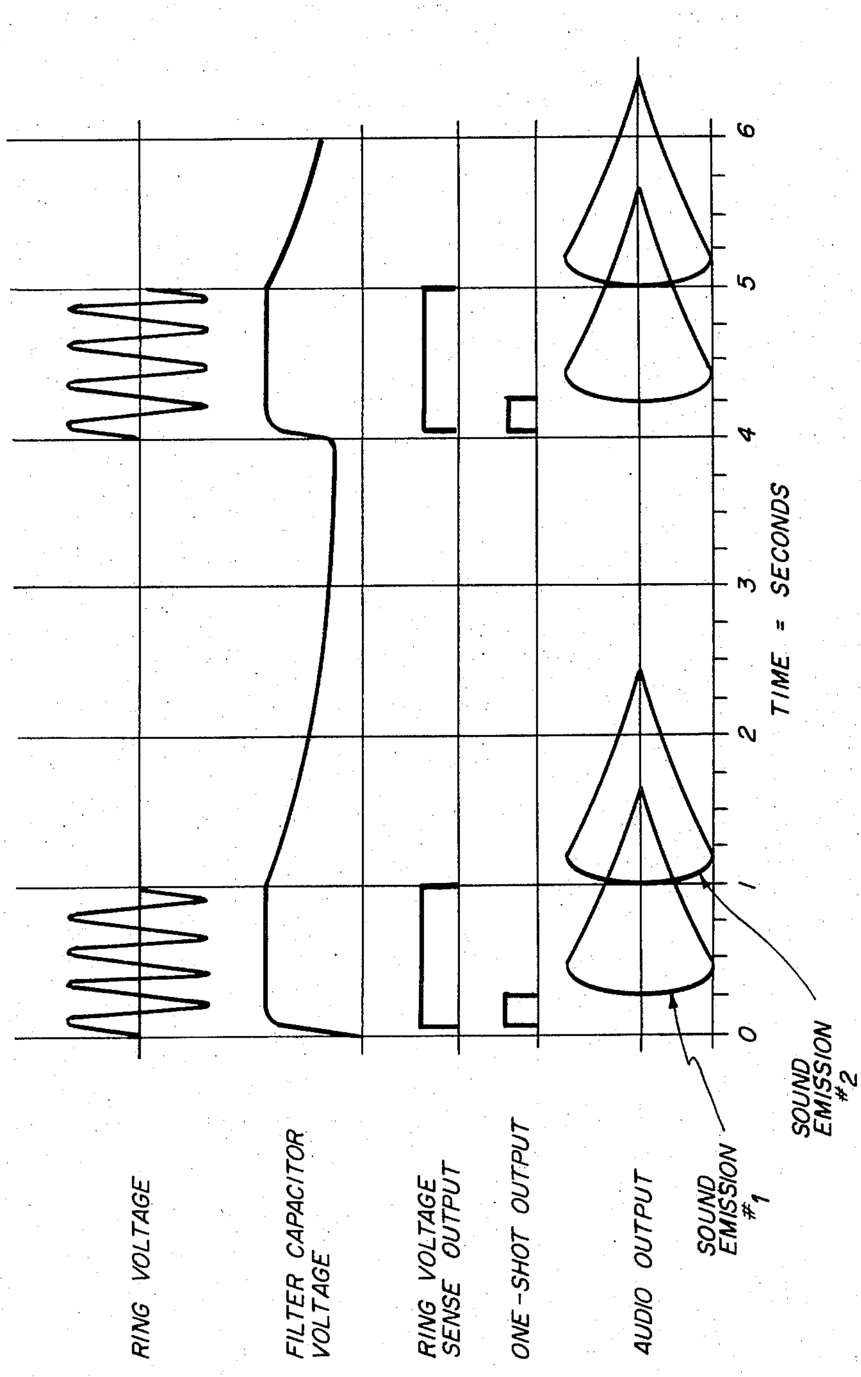
FIG. 2 is a waveform chart showing schematically the inputs and outputs of FIG. 1.

The block diagram of FIG. 1 shows a circuit with its input across the leads T and R of a telephone station line or the like. In the circuit of FIG. 1, diodes D1–D4 form a conventional full-wave bridge rectifier. Pulsed ringing voltage from the line is applied to the bridge rectifier by coupling capacitor C1 (which blocks DC voltage). The DC output of the bridge rectifier charges capacitor C2 to the peak value of the bridge input voltage. The voltage stored on capacitor C2 provides the power source for the tone generator. This voltage discharges at a relatively slow rate during ringing voltage OFF time as shown by FIG. 2.

A secondary function of diodes D1–D4 is to isolate telephone signal voltage from the tone generator. The inherent 1.4 volt threshold of the bridge rectifier, due to the voltage-current characteristics of silicon diodes, is above the normal signal voltage level. Therefore, the tone generator of FIG. 1 presents high impedance to signal voltage.

Voltage across capacitor C2 is reduced and regulated by the action of the constant current source 40 and zener diode Z1. Capacitor C3 is a bypass filter capacitor. The constant current source provides approximately 2 milliamperes regardless of wide variations of input voltage and load resistance. This current is sufficient to supply all the low voltage requirements of the circuit. Zener diode Z1 shunts the excess current and stabilizes the voltage to 6 volts. The combination of capacitor C2, constant current source 40, and zener diode Z1 provides a stable 6 VDC for most of the ringing cycle (capacitor C2 may discharge sufficiently to appreciably lower the 6 VDC just before the start of the next ring voltage ON cycle), and over a wide range of ringing terminal voltages.

The sound emitted by the generator originates in the four oscillators 30, 32, 34 and 36 shown in FIG. 1. Each of the oscillators is an independent Twin-T circuit with emitter follower buffer. All four oscillators should preferably produce good quality sine waves and oscillate whenever the input of the 6 VDC source is present. As discussed above, the 6 VDC is present during most of the ringing cycle. Therefore, the four sine wave outputs are present almost continously beginning with the first full ring voltage ON cycle. Typical frequencies of four oscillators which have been found to operate successfully are respectively 1,760, 1,770, 1,395 and 1,405 Hz. The first pair of typical frequencies (1,760 and 1,770 Hz) produce sound emission no. 1 and the second typical pairs (1,395 and 1,405 Hz) produce sound emission no. 2 as viewed in FIG. 2. These values are noted for explanatory purposes as frequencies usable herein. With any proper combination of frequencies, a number of conditions should be met as noted. Emissions No. 1 and 2 are nominally separated by a musical third. Each emission is composed of the sum of two nearly equal frequencies to simulate vibrato echo effect of a bell.

Ring voltage sense circuit 50 provides a well defined rectangular pulse output coincident with the ring voltage "ON" period as can be seen from FIG. 2. This pulse is used to set-up and activate the circuits that shape the outputs of the four oscillators to simulate a bell. The input to the ring voltage sense circuit 50 is provided by diodes D6 and D5 connected directly to the line. Line voltage must exceed a threshold before an output is produced.

One-shot mulivibrator 60 provides a rectangular pulse approximately ¼ second long beginning with the leading edge of the Ring Voltage Sense output. The multivibrator output is used to set-up and activate circuits that produce sound emission No. 1. Sound emission No. 2 is set-up and activated directly from the ring voltage sense output.

Two variable gain drivers, 70 and 74, shape the output of each pair of oscillators to simulate a bell. The drivers drive the audio power amplifier in response to a control pulse from the multivibrator or the ring voltage sense circuit 50. The drivers are normally in a high attenuation (cut-off) condition, and produce no sound output. A rectangular pulse of the proper duration sets the driver to a gain condition that produces a sound output. The gain is maximum at the pulse trailing edge and immediately begins to reduce until the cut-off condition is again reached. This action produces the sudden appearance and gradual decay of sound that is characteristic of physically striking a bell, as indicated by the waveform of FIG. 2.

Driver 74 is controlled by the multivibrator to produce sound emission No. 1 approximately ¼ second after the ring voltage appears.

Driver 70 is controlled by the ring Voltage Sense circuit. Sound emission No. 2 begins at the end of the ring Voltage input which normally occurs one second after appearance of the ring input.

The control pulses fed to the drivers must exceed a minimum length before any sound output is produced. This characteristic combined with the voltage threshold of sensing circuit 50 make the tone generator almost completely immune to extraneous noises in response to line voltage transients. In explaining the operations of this circuit, we must distinguish between the ringing cycle and ON-OFF times during the ringing cycle. Our definition of "ring cycle" is the overall time that the phone rings (this ringing cycle period includes both actual ringing and pauses between ring bursts). Ring voltage ON period to ring voltage OFF period refers to the time during the ring cycle that voltage is present or absent, respectively.

Audio power amplification is effected by a single high voltage transistor Q1 and associated bias resistors. This transistor is driven and biased by the combined outputs of the drivers 70 and 74 to drive the transducer directly from the high voltage across capacitor C2. This arrangement, although it requires a high impedance transducer, provides efficient utilization of the available power. Additional power economy results from the bias arrangement for transistor Q1, which effectively operates in class A. The drivers are directly coupled to the base of transistor Q1. Both the DC level and AC output of the drivers vary in response to the control pulse input. The DC level varies in the proper manner to provide bias current sufficient to provide class A operation for the AC level being amplified. This form of amplification provides low distortion, yet does not waste current when little or no signal is being amplified.

Figure 3:
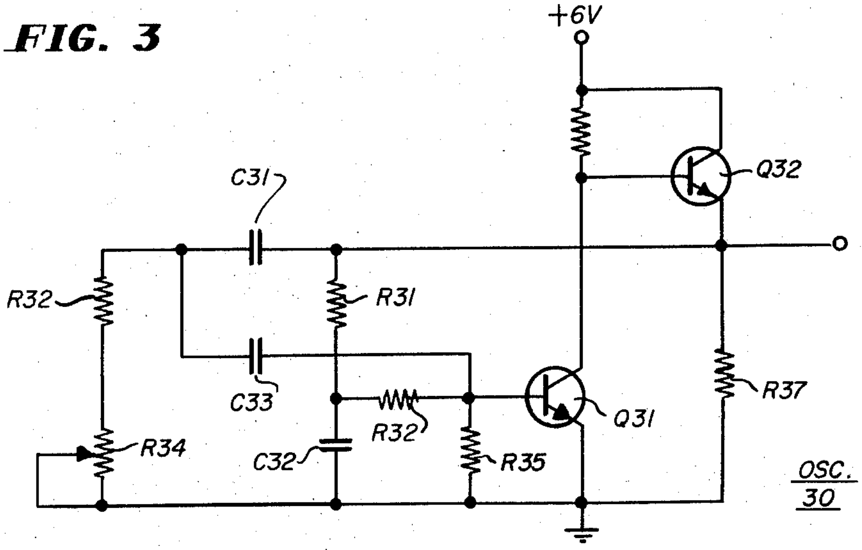
FIG. 3 is a schematic circuit diagram of an oscillator of FIG. 1.

Turning now to the individual circuits in FIG. 3, we show a typical oscillator 30 in detail. The remaining oscillators 32, 34 and 36 are similar to oscillator 30 differing only in the values of its resistors and capacitors.

Oscillator 30 is of standard Twin-T design with transistor Q31 providing the required gain and phase inversion and transistor Q32 providing buffering. Bias for transistor Q1 is provided by resistors R31, R32, and R35; and capacitors C31, C32, and C33. This network provides a small positive feedback signal near its null frequency, which produces oscillation. Resistor R34 provides an adjustment of the feedback signal and may be used to vary the frequency a small amount and/or adjust feedback for good waveform.

Figure 4:
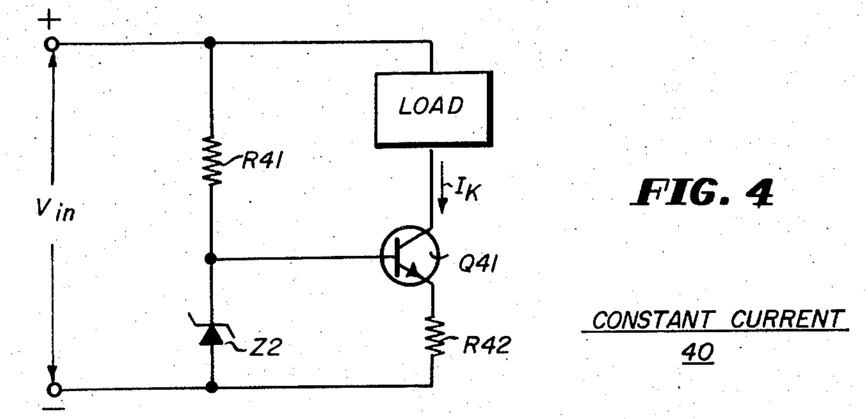
FIG. 4 is a schematic circuit diagram of a constant current source of FIG. 1.

The constant current circuit 40 is shown in detail in FIG. 4. This circuit develops constant current at the collector output of transistor Q41. The emitter current in transistor Q41 is established by the constant voltage provided by Zener diode Z1 less the base-emitter voltage drop, divided by the resistance R42. This emitter current is relatively stable over large excursions of input voltage changes or collector current, due to the current gain of transistor Q41. Since collector current is almost identical to emitter current, the collector output current is also relatively constant.

Figure 5:
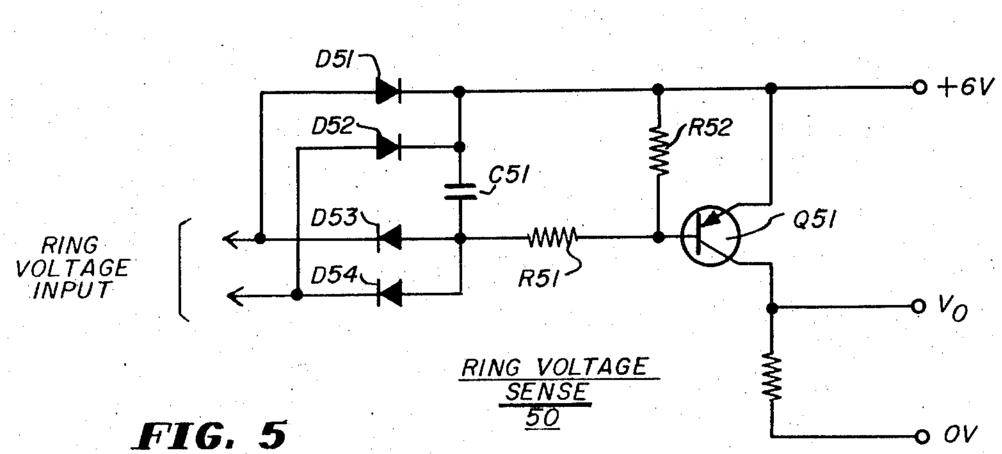
FIG. 5 is a schematic circuit diagram of the ring voltage sensing circuit of FIG. 1.

The ring voltage sensing circuit 50 is shown in detail in FIG. 5. Ring voltage as received is rectified by the diodes D51, D52, D53, and D54. The capacitance of capacitor C51 is chosen to provide some filtering of the ring voltage frequency, but is small enough to rapidly follow the envelope of the ON-OFF cycle. Resistors R51 and R52 form a voltage divider. When the rectified ring voltage is of sufficient amplitude to produce approximately 0.6 volts across resistor R52, transistor Q51 turns on. When transistor Q51 turns on, the output voltage $V_o$ rises to approximately +6V and remains at this level until the ring voltage falls below the threshold established by resistor R51 and R52. Thus, the circuit senses ring input voltage to produce an output.

Figures 6, 6A:
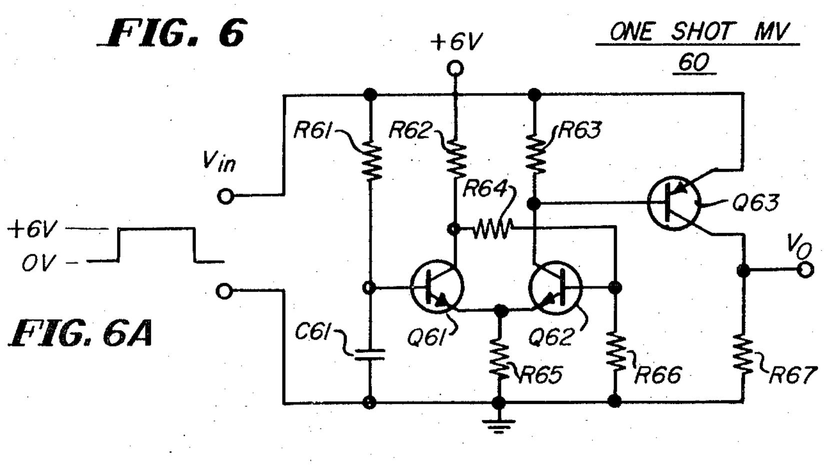
FIG. 6 is a schematic circuit diagram of the one shot multivibrator of FIG. 1, with FIG. 6A showing the input wave form to the circuit and FIG. 6B, the output waveform.

The multivibrator 60 is shown in detail in FIG. 6. The normal condition of the multivibrator 60 occurs when $V_{in}$ is at zero volts. At this time capacitor C61 is completely discharged. Transistor Q61 is OFF. Transistor Q62 has base drive, but no collector current flows because its voltage source ($V_{in}$) is zero. Transistor Q63 is OFF since transistor Q62 cannot provide base drive. Therefore, the output voltage $V_o$ is zero.

When the ring voltage sense circuit causes $V_{in}$ to switch to +6V, the multivibrator operates as follows: Transistor Q61 initially remains OFF due to the zero charge on capacitor C61. Collector current flows in transistor Q62 from $V_{in}$. Part of this current flows from the base of transistor Q63 turning it ON. $V_o$, then, is initially at, or near, the level of $V_{in}$. Capacitor C61 charges from $V_{in}$ through resistor R61. When the voltage on C61 reaches the approximate voltage level at the base of transistor Q62, transistor Q61 begins to conduct. Due to regenerative feedback (transistors Q61 and Q62 are basically a Schmitt trigger circuit during this period) Q61 rapidly turns ON and Q62 turns OFF. When Q62 turns OFF, Q63 also turns OFF and $V_o$ goes back to zero volts.

The variable gain driver (VGD) circuits 70 and 74 perform the basic waveshaping required to simulate a chime. The driver accepts a positive pulse input, ($V_{in}$) and two continuous sinewave audio inputs, and produces a variable DC level output with the superimposed sum of its two inputs.

Transistors Q74 and Q75 are connected as a differential amplifier with the amplified output taken from the collector of Q75. Transistor Q72 provides a current source bias to the emitters of transistors Q74 and Q75. Transistor Q72 mirrors the current flowing into diode connected transistor Q73, with transistors Q72 and Q73 being matched transistors. The DC bias current provided by transistor Q72 and shared by transistors Q74 and Q75 is established by resistor R75 and to a lesser extent by resistors R74 and R80. (Resistors R74 and R80 are directly coupled to the oscillators. Therefore, some DC current flows into transistor Q73 via resistors R74 and R80.) The current division between transistors Q74 and Q75 depends on the base voltage of each transistor. The static or normal condition, when $V_{in}$ is zero and transistor Q71 is cut-off is that transistor Q75 is cut-off and transistor Q74 takes all the current from transistor Q72. This condition results from transistor Q74 having a higher base voltage than transistor Q75. The base voltage for transistor Q74 is established by the voltage division of resistors R73 and R72 when transistor Q71 is cut-off. The base voltage for transistor Q75 is established by the voltage dividing resistors R78 and R79, buffered by emitter follower Q76. During the static condition capacitor C71 acquires a charge with the A side being positive relative to the B side.

The DC current flowing into transistor Q73 from resistors R74 and R80 varies at the frequencies of the respective oscillators. Thus, the current source provided by the collector of transistor Q72 is composed of a DC component modulated by the sum of frequencies *f*1 and *f*2.

During the static period (with transistor Q75 cut-off) the output voltage $V_o$ is at +6VDC. No signal voltage is present in $V_o$ because all current is taken by transistor Q74 and transistor Q75 is cut-off.

A positive pulse at $V_{in}$ initiates the dynamic operation of the variable gain driver. This pulse saturates transistor Q71 and brings the base of transistor Q74 and side A of capacitor C71 to ground level. This action turns transistor Q74 off. Transistor Q75 also remains OFF because, during the static period, capacitor C71 acquired a charge to render its B side negative relative to the A side. Thus, when transistor Q71 saturates, the positive side of capacitor C71 is grounded, which makes the base of transistor Q75 negative, keeping it OFF. Capacitor C71 charges during the input pulse period from a voltage level determined by the time constant determined by the combination of resistor R77 and capacitor C71. The R-C time constant is chosen such that capacitor C71 does not reverse its charge and charge sufficiently positive to turn on transistor Q75. Thus, during the input pulse there is no change, from static conditions, of the output voltage $V_o$.

When the input pulse ends ($V_{in}$ returns to 0 volts) transistor Q71 turns OFF and the base of transistor Q74 seeks to return to the voltage established by the divider comprised of resistors R72–R73. Capacitor C71 now is charged to render its B side more positive than its A side (due to charging during input pulse, as discussed in the preceeding paragraph). The base of transistor Q75 is more positive than the base of transistor R74 and causes transistor Q75 to conduct sufficiently to place the collector of transistor Q75 in its linear operating region. This action, which occurs simultaneously with the input pulse trailing edge causes $V_o$ to fall to approximately 3 VDC with the sum of *f*1 and *f*2 swinging $V_o$ from approximately 6V to 0V. (See the waveform of $V_o$). This type of waveform produces maximum output from the transducer.

The fact that transistor Q75 does not turn on until the trailing edge of the $V_{in}$ pulse may be explained as follows. When transistor Q71 is on and the base of transistor Q74 is at ground, capacitor C71 would have to charge to approximately 0.6 V to turn ON transistor Q75. The capacitor normally does not charge long enough to reach this level. However, when transistor Q71 turns OFF and the voltage on the base of transistor Q74 rises, a linear operating mode for the differential transistor pair of Q74 and Q75 is again established, and current division between the two transistors is dependent on difference in base voltage. This difference can be much less than .6V to drastically affect the current division due to the gain and matched characteristics of the transistors. Thus, the charge on capacitor C71, though less than 0.6V, is sufficient to cause transistor Q75 to conduct when transistors Q74 and Q75 are operating (as a differential, matched pair).

Figure 6B:
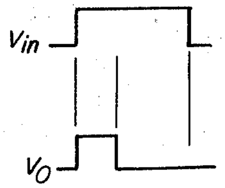
Figures 7, 7A:
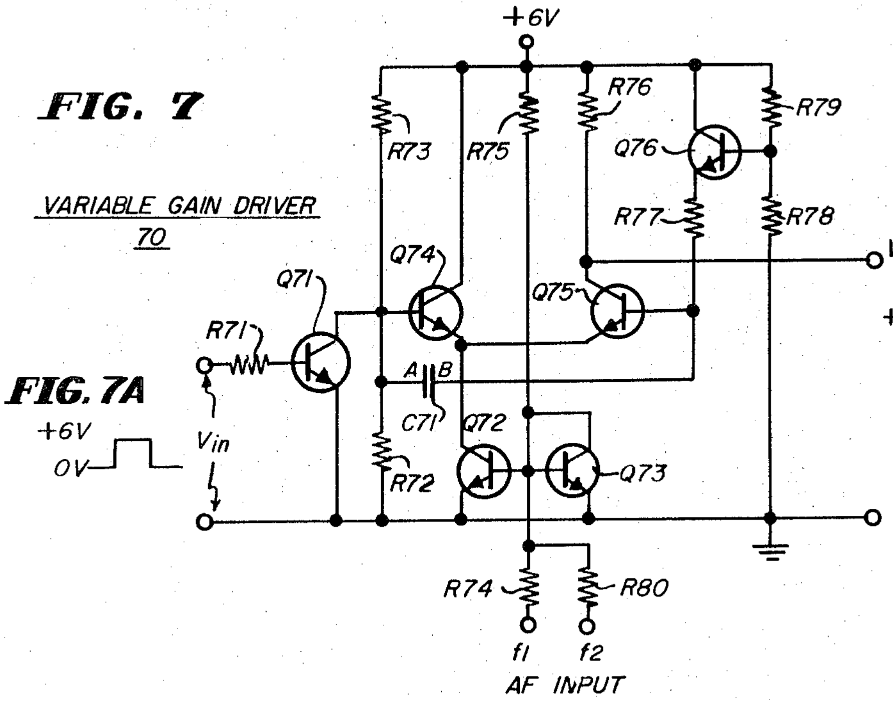
FIG. 7 is a schematic circuit diagram of the variable gain driver circuit with FIG. 7A showing the input waveform to the circuit and FIG. 7B, the output waveform.
Figure 7B:
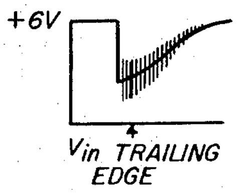

The charge acquired by capacitor C71 during the input pulse period immediately begins to reverse itself toward the static situation after the input pulse trailing edge. As capacitor C71 charges toward the static condition, transistor Q75 draws less and less current as transistor Q74 takes more and more. As transistor Q74 takes more and more of the bias and signal current, the output $V_o$ gradually has reduced signal voltage swing and the DC level gradually approaches the static +6V condition. This action coincides with capacitor C71 reverting to its static condition. Thus the output $V_o$ has the wave-shape shown in FIG. 6B, which produces a sound from the transducer like a bell struck and then gradually decaying to quiet.

Figure 8:
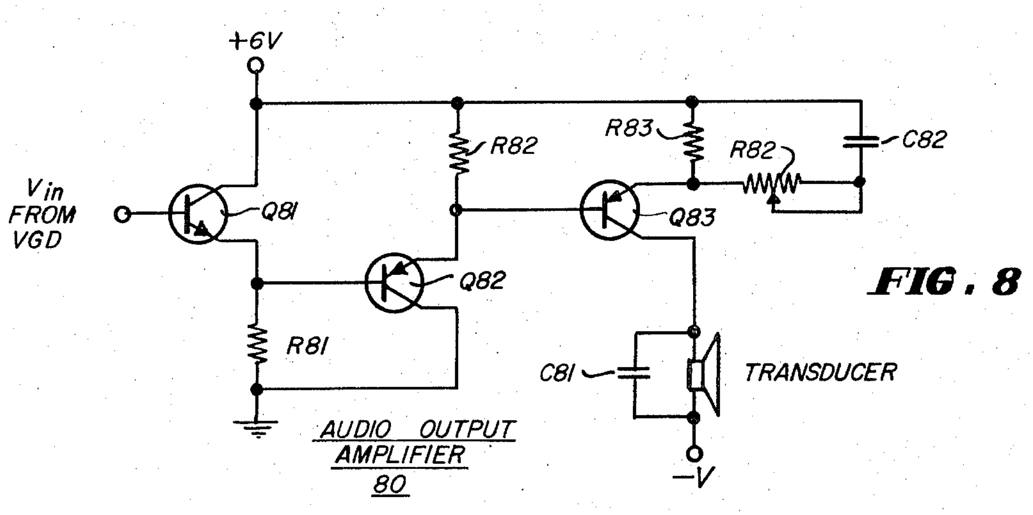
FIG. 8 is a schematic circuit diagram of the audio output amplifier of FIG. 1.

The audio output amplifier of FIG. 8 accepts the output of the Variable Gain Driver and linearly drives a transducer. It is especially designed to efficiently utilize the small available power.

In this amplifier, transistors Q81 and Q82 form a buffer to present a high impedance to the driver 70, yet adequately drive the output transistor. Transistors Q81 and Q82 are connected as a NPN-PNP emitter follower to provide direct coupling (DC operation) with small offset. The circuit of transistor Q83 is a standard amplifier circuit with emitter degeneration provided by the combination of resistors R83 and R84 and capacitor C82. Resistor R84 is a variable resistor used as a volume control, since it controls the gain of transistor Q83. Transistor Q83 is a high voltage transistor whose collector drives a high impedance transducer.

During the static period, the input voltage is +6V. The emitter of transistor Q81 is therefore at approximately +5.3V. Since transistor Q82 is a PNP transistor, its emitter is at +6V. In other words, the combination of transistors Q81 and Q82 transfer the input DC level without offset to the base of transistor Q83. Transistor Q83 is cut-off during the static period since its emitter and base are at the same voltage. This practice is very economical of supply current.

When the input drops from +6V to approximately +3V, modulated by the sum of *f*1 and *f*2, the base of transistor Q83 also drops to +3VDC with $f1$ and $f2$ superimposed. This level forward biases the base of transistor Q83 to cause this transistor to conduct and establish a collector current in the linear operating region. The AC component, which is the sum of f1 and f2, appears at the collector of transistor Q83 greatly amplified (depending on the setting of resistor R84).

This audio signal drives the transducer. As the input gradually returns to +6V and the AC component decays, the bias current in transistor Q83 drops and the transducer output tapers off. The result is shown as the audio output in FIG. 2. This waveform shows the result of both drivers; the action described above is that produced by one of the drivers at a time.

By the principle shown herein a basic two tone sound is generated in response to each AC ring voltage, the first tone once initiated decaying over a period of time while the second tone is initiated a timed period thereafter, with an overlap period during which both tones are emitted. The second tone decays at a rate generally equal to that of the first tone.

While there has been described what is at present thought to be a preferred embodiment of the invention, it will be understood that modifications may be made herein and it is intended to cover in the appended claims all such modifications which fall within the true spirit and scope of the invention.

We claim:

1. An audio signal generator for electronically simulating the audio output produced by a mechanical chime and including means in said generator for producing two tones separated by a musical third, each of said two tones comprised of the sum of two frequencies separated by approximately 10 Hz, means for shaping said tones in amplitude to simulate an envelope of successive mechanically struck mechanical chimes at predetermined time intervals, and said generator including means responsive to standard telephone ringing voltage to initiate and power said generator, and wherein the means for said shaping said two tones comprises a ring voltage sense circuit to detect a ringing signal, and a monostable multivibrator responsive to detection of a ringing signal by said ring voltage sense circuit to produce a signal output, a variable gain driver that receives as input the first tone and a signal output of the monostable multivibrator, the operation of said variable gain driver initiated by the output of the monostable multivibrator and producing a combined DC and AC output voltage necessary to drive an audio amplifier and a transducer to simulate a single strike of a gong.

2. A signal generator as claimed in claim 1, wherein said generator also comprises a second variable gain driver that receives as input the second tone and the output of the ring voltage sense circuit, said second variable gain driver initiated by the output of the ring voltage sense circuit for producing a DC and AC output voltage necessary to drive said audio amplifier and transducer to simulate another single strike of a gong, said audio amplifier combining the outputs of said two variable gain drivers to drive said transducer, and said audio amplifier having the properties of low power requirements for low distortion amplification.

3. A tone generator adapted to respond to a validated input telephone ringing signal of predetermined duration, said generator comprising a plurality of oscillators operatively responsive to the validated input signal to produce respective output signals of predetermined different audio frequencies, a first attenuating amplifying means coupled to receive output signals from a first of said oscillators, a second attenuating amplifying means coupled to receive output signals from a second of said oscillators, said first amplifying means operative after the receipt of a validated input signal for transmitting a tone signal based on its received signals and for gradually attenuating said tone signal to an attenuated level, means for delaying the start of an output tone signal from said second amplifying means until the output tone signal from said first amplifying means is at a partially attenuated level whereby the output tone signals from said amplifying means overlap for a predetermined time period, said second amplifying means operative in a attenuating manner to attenuate its output tone signal, and an output audio device receptive of said output tone signals for producing chimelike audible signals therefrom.

4. A tone generator as claimed in claim 3, wherein the oscillators of said plurality are paired, and in which there are means for summing the output signals of each pair, said summing means being coupled to the respective amplifying means, and each said amplifying means comprises a variable gain driver.

5. A tone generator as claimed in claim 4, wherein said delaying means are responsive to the end of the duration of said input signal for initiating the output tone signal from said second amplifying means.

6. An electronic tone generator for simulating the sound of a two-tone mechanical chime in response to a telephone ringing signal, and comprising a first pair of oscillators, each productive of a separate output frequency spaced from one another about a first basic frequency, a second pair of oscillators each productive of a separate output frequency spaced from one another about a second basic frequency, said first and second basic frequencies being spaced apart by a predetermined frequency range, means responsive to a valid ringing signal for initiating production of output frequencies by said oscillators, means for summing amplitudes from said first pair of oscillators, a first variable gain driver coupled to the output of said summing means, further summing means coupled to the output of said second pair of oscillators, and a second variable gain driver coupled to the output of said further summing means, means for initiating an output signal from said first driver after the start of said ringing signal, means for delaying an output signal from said second driver to overlap with the output signal from said first driver.

7. An electronic tone generator as claimed in claim 6, wherein each variable gain driver attenuates the output from the summing means gradually from an original high level to an attenuated low level.

8. An electronic tone generator for simulating the sound of a mechanical chime in response to a telephone ringing signal, said generator comprising, in combination: a plurality of oscillators, each oscillator providing a substantially constant output signal having a frequency different from the frequency of the other oscillators; first means for summing the output signals of a first pair of said oscillators, second means for summing the output signals of a second pair of said oscillators, first amplifying means operative after receipt of said ringing signal to emit an amplified signal based on said summed output of said first pair of oscillators during a first given time period wherein the amplitude of said summed signal emitted by said amplifying means decays from an amplified level to an attenuated level during said first given time period, second amplifying means operatively responsive to the end of said ringing signal to emit an amplified signal based on the summed output of said second pair of oscillators during a second given time period wherein the amplitude of said summed signal emitted by said second amplifying means decays from a first level to a second level during said second given time period, and wherein said first and second given time periods overlap for a further time period, and an output transducer receptive of the output signals from said amplifying means to produce a two-tone chime-like audio output.

* * * * *